United States Patent [19]
Spacher et al.

[11] Patent Number: 5,041,728
[45] Date of Patent: Aug. 20, 1991

[54] PORTABLE PERSONNEL MONITOR WHICH IS COLLAPSIBLE FOR TRANSPORTING AND STORAGE

[75] Inventors: Peter J. Spacher; Paul F. Spacher; Mark Spacher, all of Rochester, N.Y.

[73] Assignee: Rochester Gas and Electric Corpration, Rochester, N.Y.

[21] Appl. No.: 450,716

[22] Filed: Dec. 11, 1989

[51] Int. Cl.$^5$ .............................................. G01T 1/163
[52] U.S. Cl. .............................. 250/366; 250/363.08; 250/394
[58] Field of Search .................... 250/394, 366, 363.08; 378/193

[56] References Cited

U.S. PATENT DOCUMENTS

| | | | |
|---|---|---|---|
| 2,842,676 | 7/1958 | Schiring et al. | 378/197 |
| 3,174,040 | 3/1965 | Eberline | 361/175 |
| 3,218,460 | 11/1965 | Scherbatskoy | 250/369 |
| 3,670,164 | 6/1972 | Hardy et al. | 250/366 |
| 3,895,232 | 7/1975 | Schneeberger | 250/366 |
| 4,352,019 | 9/1982 | Pollard | 250/394 |
| 4,509,042 | 4/1985 | Kruse | 340/600 |
| 4,598,202 | 7/1986 | Koechner | 250/366 |
| 4,731,535 | 3/1988 | Rische et al. | 250/394 |

FOREIGN PATENT DOCUMENTS

| | | |
|---|---|---|
| 60574 | 9/1982 | European Pat. Off. |
| 2413027 | 9/1975 | Fed. Rep. of Germany |
| 1013755 | 12/1965 | United Kingdom |
| 2148490 | 5/1985 | United Kingdom ................ 250/394 |

OTHER PUBLICATIONS

CDRL 950442-104, "Safeguards Personnel Monitor", J. L. Martinez, G. J. Cummingham (Jan. 26, 1972).
RFP-2102-A, "Research and Ecology Semiannual Progress Report", R. D. Forest (Aug. 13, 1973).
RFP-2200-A, "Research and Ecology Semiannual Progress Report", R. D. Forest, (Mar. 18, 1974).

*Primary Examiner*—Constantine Hannaher
*Attorney, Agent, or Firm*—Martin Lukacher

[57] ABSTRACT

A portable personnel monitor that is easily transported, set up and operated to perform radiological contamination testing of personnel is provided by a collapsible frame containing scintillation detectors. The frame has hinged columns as side members and a top member which is releasably connected with electrical and mechanical connecting and alignment devices to the columns. A signal analyzer unit is attached to one column via a T-slot and is connected to the scintillator detectors via a coaxial cable. A base plate having upstanding posts supports the frame rigidly in an upright position and is releasably connected to the columns by push/pull pins. The frame defines a passage which is of sufficinet height so that an adult human subject can pass through the radiation sensitivity field defined by the detectors. For transporting the monitor, the top frame member is unplugged and released; the signal analyzer unit is detached from the column; the columns are detached from the base and folded over into compact size. The collapsed unit is stored in suitcase size containers which are readily stowable or portable. All parts of the monitor are self-contained so that the monitor can be set up without tools and rapidly put into use.

14 Claims, 10 Drawing Sheets

PORTABLE PERSONNEL MONITOR WHICH IS COLLAPSIBLE FOR TRANSPORTING AND STORAGE

DESCRIPTION

The present invention relates to personnel monitors for nuclear radiation screening, and particularly to a portable personnel monitor for nuclear radiation which is collapsible for storage or transportation and can readily be set up whenever radiological screening is required.

The invention is especially suitable for providing a radiation monitor for personnel which defines a portal through which subjects are passed for radiological screening, and especially a monitor which is self-contained and may be converted from a collapsed condition to an erect position wherein it provides the portal with radiation detector banks along each side. Personnel to be monitored pass through the portal and any contamination is detected by a signal analyzer (also known as a scaler or counter) which is removably mounted on the portal.

Industrial health and safety considerations as well as governmental regulatory requirements (for example, the FEMA/NRC regulations concerning nuclear emergencies) make it necessary to assure adequate capability to monitor human subjects and even animals. The FEMA or Federal Energy Management Agency and NRC or Nuclear Regulatory Commission regulations call for cognizant governmental agencies to provide sufficient equipment and personnel for timely monitoring of all evacuees arriving at evacuee reception centers. In a nuclear emergency, it becomes necessary to rapidly monitor large numbers of potentially contaminated evacuees. Hand-held radiation detectors do not provide a satisfactory solution to the problem, since large numbers of trained workers are needed. Without training, there can be little assurance that contamination will be detected with a hand-held meter. Fixed portals are capable of processing large numbers of evacuees, but they do not present a satisfactory solution since they are complex and expensive and cannot be transported to evacuation centers in the required time.

Several types of fixed portals have been proposed. The following documents are a representative sample of the various proposals: Hardy, et al., U.S. Pat. No. 3,670,164, Jun. 13, 1972; Kruse, U.S. Pat. No. 4,509,042, Apr. 2, 1985, Rische, et al., 4,731,535, Mar. 15, 1988; Pollard, U.S. Pat. No. 4,352,019, Sept. 28, 1982; European patent application 60574 published Sept. 22, 1982, German patent application 2413027 published Sept. 25, 1975 and British patent 1,013,755 published Dec. 22, 1965. For general information concerning radiation counters and their circuitry detectors, see the following U.S Pat. Nos.: 3,174,040, Eberline, Mar. 1965; 3,218,460, Scherbatskoy, Nov. 1965, 3,895,232, Schneeberger, Jul. 15, 1975 and 4,598,202, Koechner, Jul. 1986. In addition these portal type monitors used in the Rocky Flats, Colo. (U.S. Atomic Energy Commission, now DOE Facility) are described in publications CDRL 950442-104 (Jan. 26, 1972), RFP-2102-A, (Aug. 13, 1973) and RFP-2200-A Dec. 1973.

It has been found in accordance with the invention that a nuclear radiation monitor capable of high monitoring speed, for example several hundred subjects per hour, can be provided which is collapsible for easy storage and transportation and does not require a dedicated monitoring facility. A radiation monitor in accordance with the invention is also easy to erect or assemble because it is self contained and does not require any extraneous tools. The unit can be used by relatively inexperienced workers and detect contamination in subjects with sufficient sensitivity and consistency of results to satisfy governmental requirements.

Briefly described, a nuclear radiation monitor embodying the invention defines a passageway of sufficient size for an adult human subject and is convertible between erect and collapsed condition. When erected it can be used to process a large number of subjects very rapidly. When not in use it is readily stored and portable in its collapsed condition. The unit has a base. A column has two parts foldable over each other. The parts are connected in hinged relationship. Latch means bridges the parts and releasably secures them in erect position. The base has means for receiving the lower of the column parts and holding the column upright in erect position. The base also has means attached to the column on the base and to the base which secures the column to the base in erect position. Radiation detection means is disposed in the column and preferably has upper and lower detectors connected in a bank which provides a sensitivity pattern in a zone substantially the entire length of the column and extending inwardly from the column in a direction across the base. A pair of columns and a beam bridging and connecting them across the top are preferably provided to define a frame providing a portal through which the subjects can pass. Each of the hinged parts of each column has a radiation detector, preferably a plastic scintillator detector connected to a photo-multiplier tube. The wiring for the tubes extends through the column and across the beam. This wiring is adapted to be connected to the analyzer (e.g., a scaler analyzer and alarm system) for measuring the radiation emitted from a subject and indicating unsafe levels of contamination. The frame columns are readily disassembled from the base and from the bridging beam so as to be collapsed into a small package which can be placed in a case or cases for transportation or storage.

The foregoing features and advantages of the invention, as well as additional features advantages and objects of the invention, will become more apparent from a reading of the following description in connection with the accompanying drawings in which.

Figure 1:
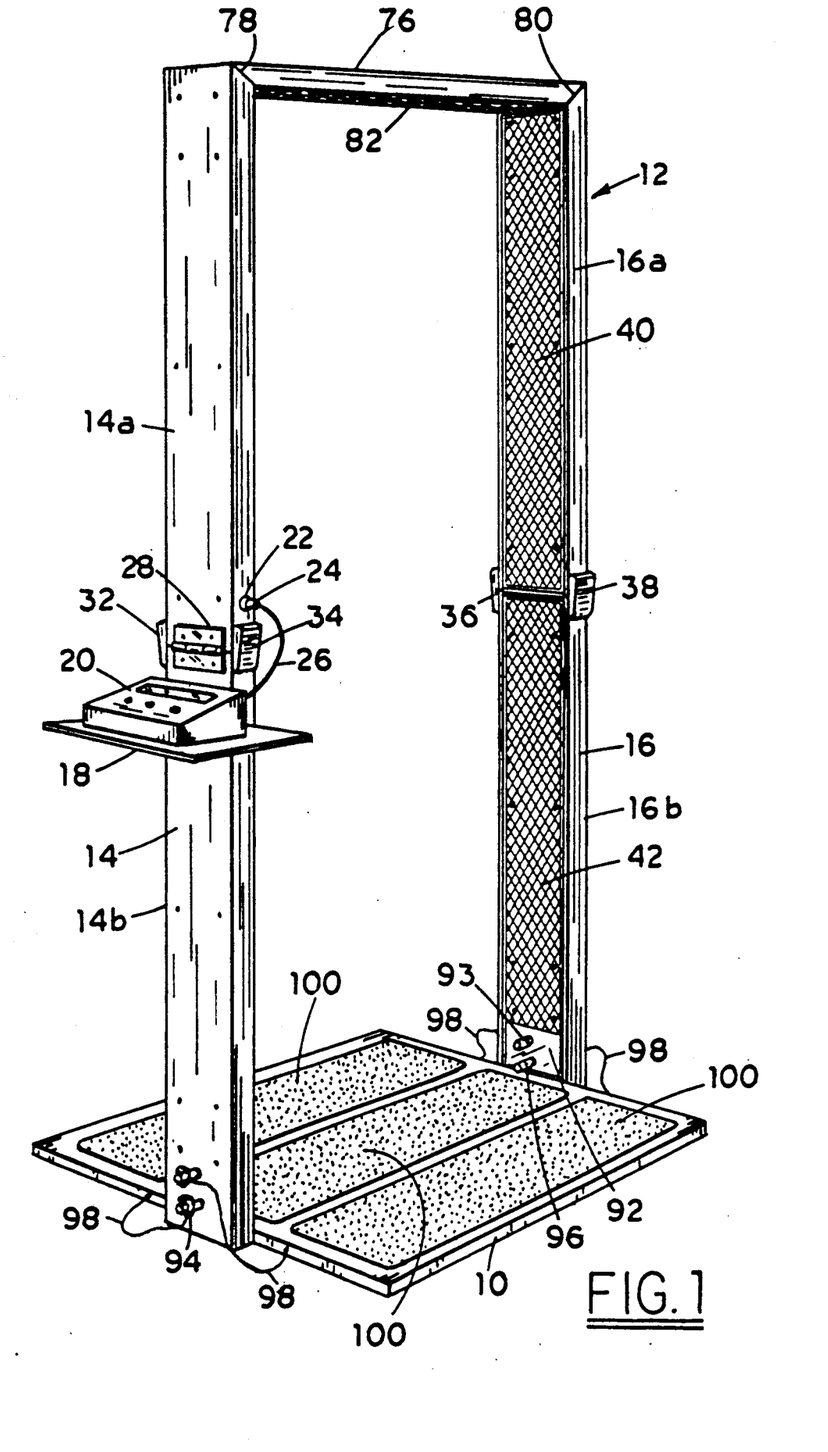
FIG. 1 is a perspective view of a portable personnel monitor in accordance with the invention.

The portable radiation monitor is shown in FIG. 1 in assembled, erect position. Its principal parts are a base plate 10 and a frame 12. The frame has opposed columns 14 and 16. Each column is identical in almost all respects to the other. The left side column differs only in that it provides means for attachment of a support 18 for a signal analyzer 20 and has a receptacle 22 for a connector 24 which connects the analyzer 20 by way of a coaxial cable 26 to the rest of the radiation monitor.

Figures 2, 3:
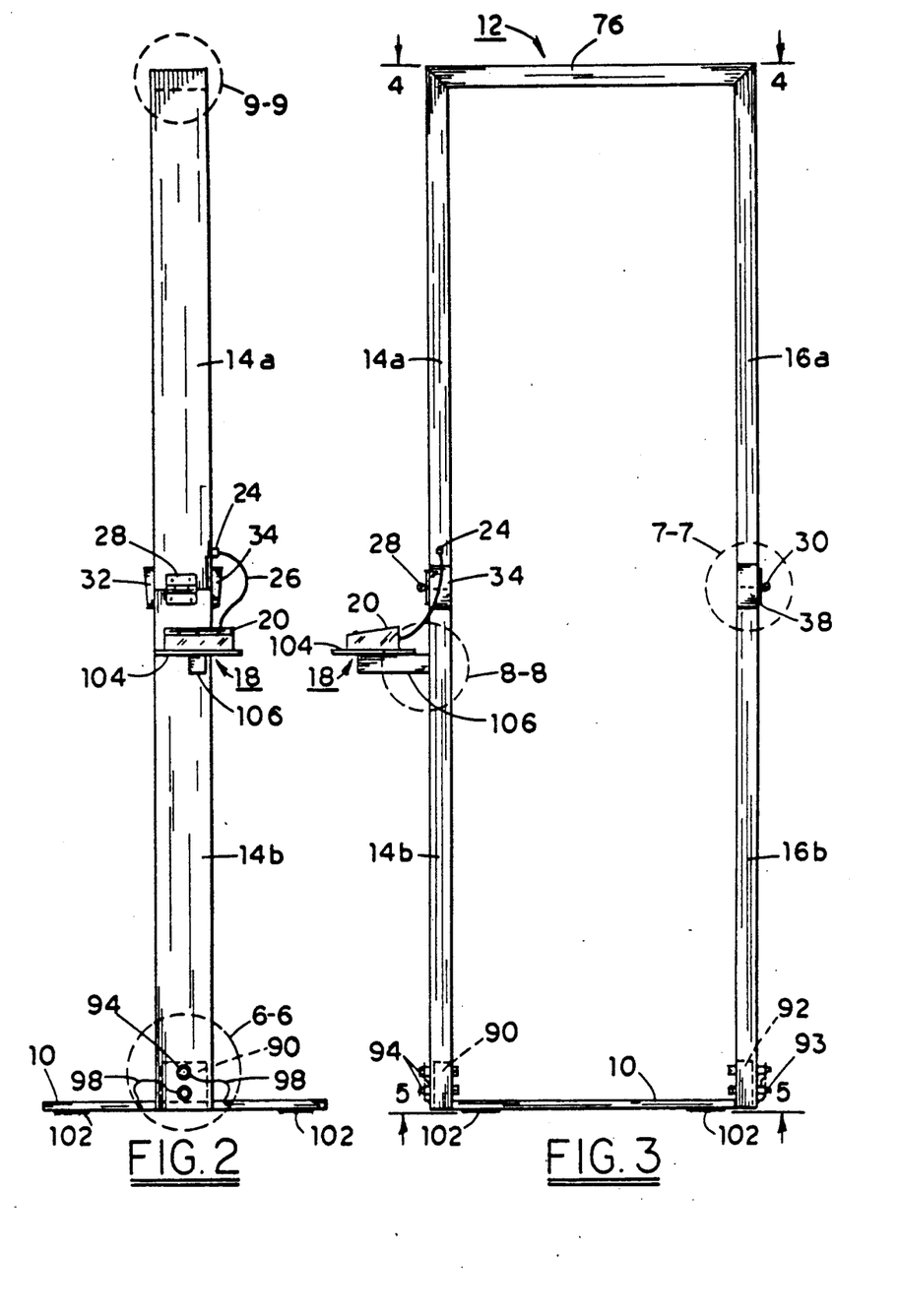
FIG. 2 is a side elevation of the monitor shown in FIG. 1.
FIG. 3 is a front elevation of the monitor shown in FIG. 1.
Figure 4:
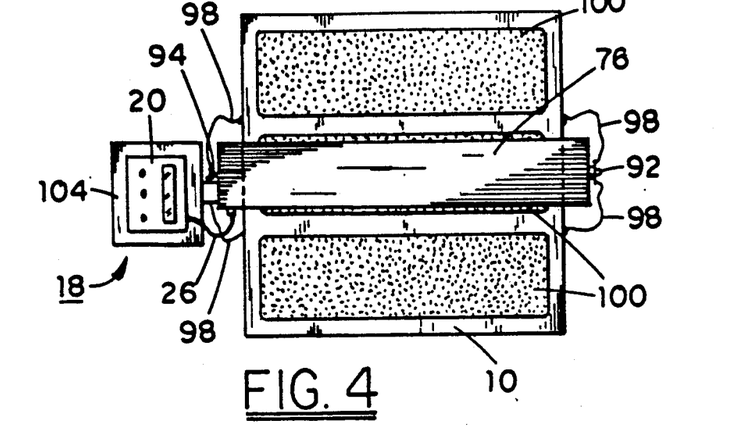
FIG. 4 is a top view of the monitor shown in FIG. 1.
Figure 5:
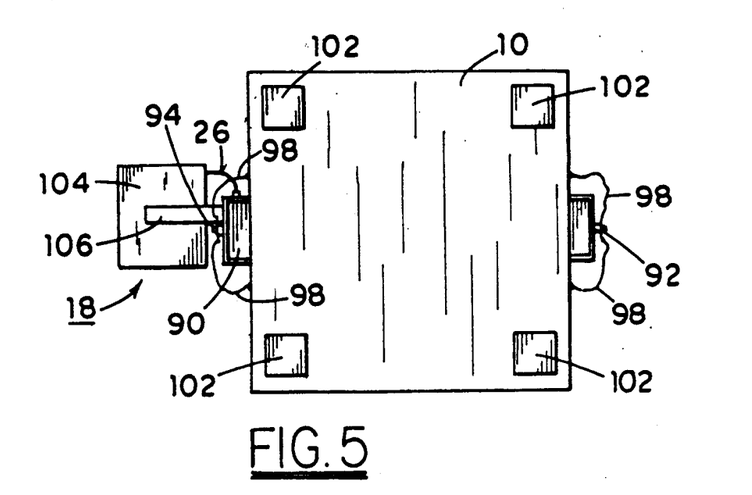
FIG. 5 is a bottom view of the monitor shown in FIG. 1.

Each column has two parts 14a and 14b and 16a and 16b which are hinged at their juncture by hinges 28 and 30. The hinge 30 connects the parts 16a and 16b of the right side column 16 and is shown in FIG. 3. The hinges make the columns foldable when collapsed. The parts of the columns are held together rigidly in upright position by draw latches 32 and 34 in the case of the column 14 and draw latches 36 and 38 in the case of the column 16. These latches are of the type used on luggage and have outer covers movable with links which define toggles. The covers hold the column parts together since they bridge the juncture between the column parts 14a and 14b and 16a and 16b. The design and operation of these latches 32 to 38 will become more apparent from FIGS. 7 and 7A.

The signal analyzer 20 is a commercially available product and is sometimes referred to as a scaler or counter. It has a cord and plug (not shown) which is connected to the power lines via the wall receptacles in the building or other facility in which the monitor is used. In other words, all that is required to operate the monitor after it is erected, is to plug the line cord from the analyzer 20 into the wall socket and plug its lead 26 into the receptacle 22 in the column 14. It should be noted that this analyzer and the monitor does not have to be operated by line voltage, but can be operated by its own battery power.

Figure 10:
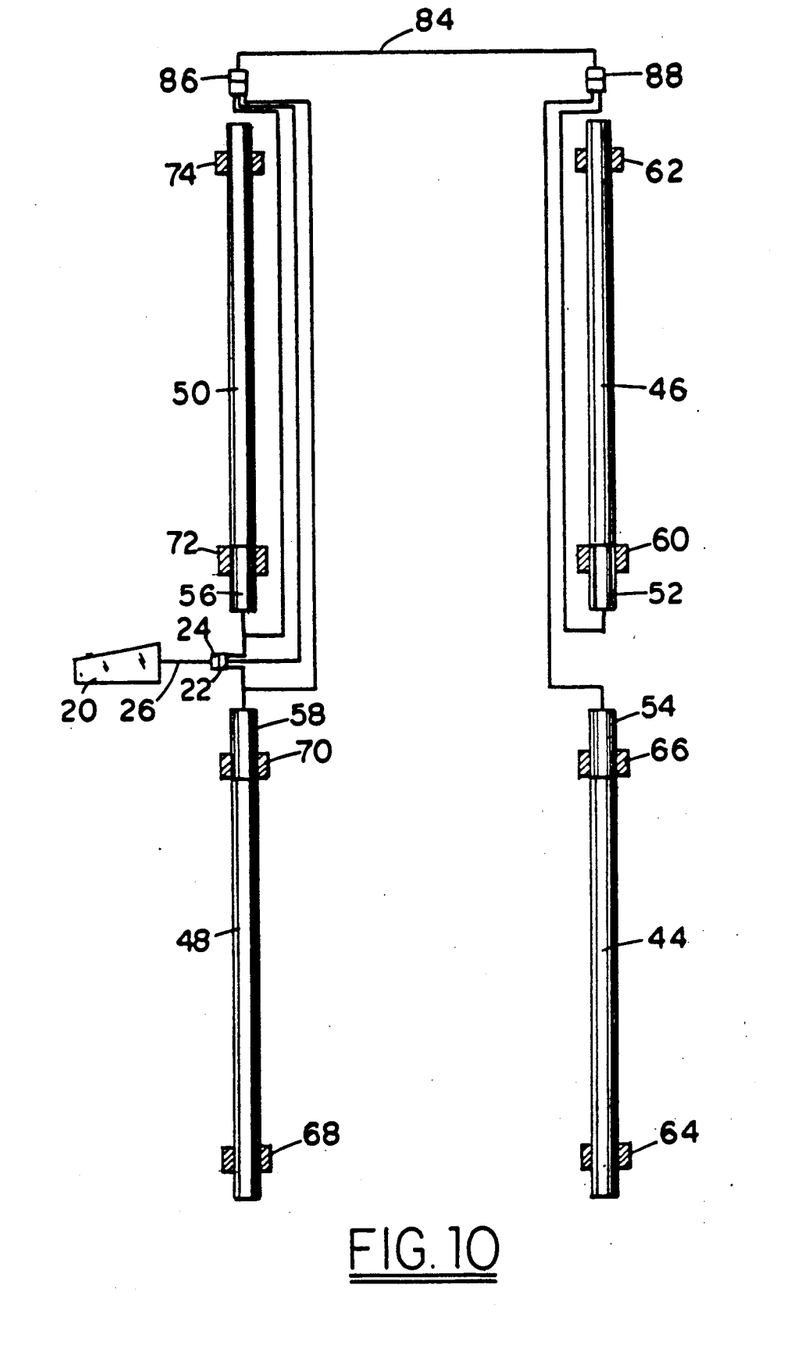
FIG. 10 is a schematic diagram of the electrical system of the monitor and showing the scintillator tubes and detectors and their supports.
Figure 11:
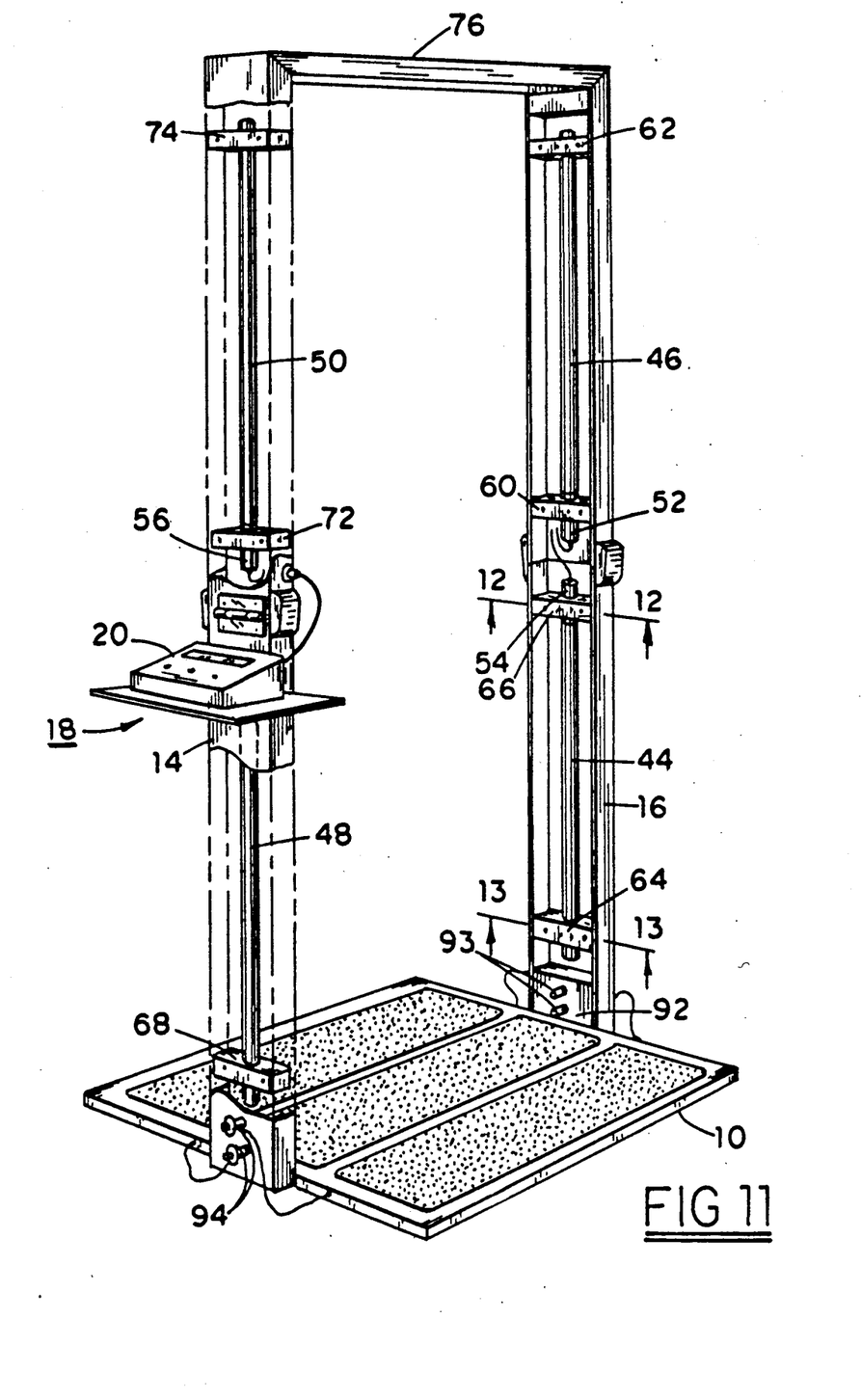
FIG. 11 is a perspective view, similar to FIG. 1 but, with one of the columns broken away and with the guards over the column removed to illustrate the internal construction of the columns.

The signal analyzer operates two banks of radiation detectors which are disposed behind guard screens across the insides of the columns 14 and 16. Two of these guard screens 40 and 42 are shown in FIG. 1. The radiation detectors are schematically shown in FIG. 10 and consist of plastic scintillator detectors or rods 44 to 50 which are exposed at one end to photodetectors in the form of photomultiplier tubes 52, 54, 56 and 58. Each of these detectors is mounted in a pair of spaced support blocks 60 & 62, 64 & 66, 68 & 70 and 72 & 74. Their arrangement and orientation will be apparent from FIG. 11. The photomultipliers 52, 54, 56 and 58 are connected by wiring, which is preferably in the form of coaxial cables, which carry signals from the photomultipliers 52 to 58 back to the analyzer 20 and apply power (high voltage) from the analyzer 20 to the photomultipliers. Only two leads are needed, one for power and the other for signal. The common or return may be the structure of the frame and the base plate which are conductive, being made of metal. The wires are shown as single conductors in FIG. 10 to simplify the illustration.

The frame is completed by a beam 76 or top frame member which forms mitered joints 78 and 80 with the top parts 14a and 16a of the columns 14 and 16. A guard 82 of wire mesh screening similar to the guards used over the column parts 14a and 14b, and 16a and 16b protects the wiring in the beam 76, which is illustrated in FIG. 10 as the single coaxial cable 84. The top frame member has readily engageable and disengageable mechanical and electrical connectors. The electrical connectors 86 and 88 are schematically shown in FIG. 10. They enable the disassembly of the top frame member 76 from the columns 14 and 16 when the member 76 is withdrawn from the columns 14 & 16.

The columns are supported upright on the base plate 10 by posts or mounting blocks 90 and 92. The mounting block 92 supports the right side column 16 and is shown in FIG. 1. The other mounting block 90 is shown in FIG. 3 as well as in other figures of the drawing. The connection and mounting of the columns is releasably secured by pairs of push/pull pins 94 and 96 which extend through holes in the columns and posts which are aligned with each other. The pull pins have telescoping sections which enable a cross pin to be retracted so that the pins can be pulled out for rapid disassembly of the radiation monitor. The pull pins are self contained in the monitor and are connected to the base plate by cords or cables 98.

Referring to FIGS. 2 through 5, the monitor is shown in erect position as in FIG. 1. The height of the columns may be approximately 7 feet and the width between the columns and across the beam 76 may be approximately 2-3 feet. This provides a passageway for an adult human subject. The base plate 10 has sheets 100 of anti-slip material which may be attached thereto with adhesive or may have self-adhering backings. On the bottom side of the base plate 10 are four feet 102 which may of rubber or other non-slip material.

Figures 8, 8A:
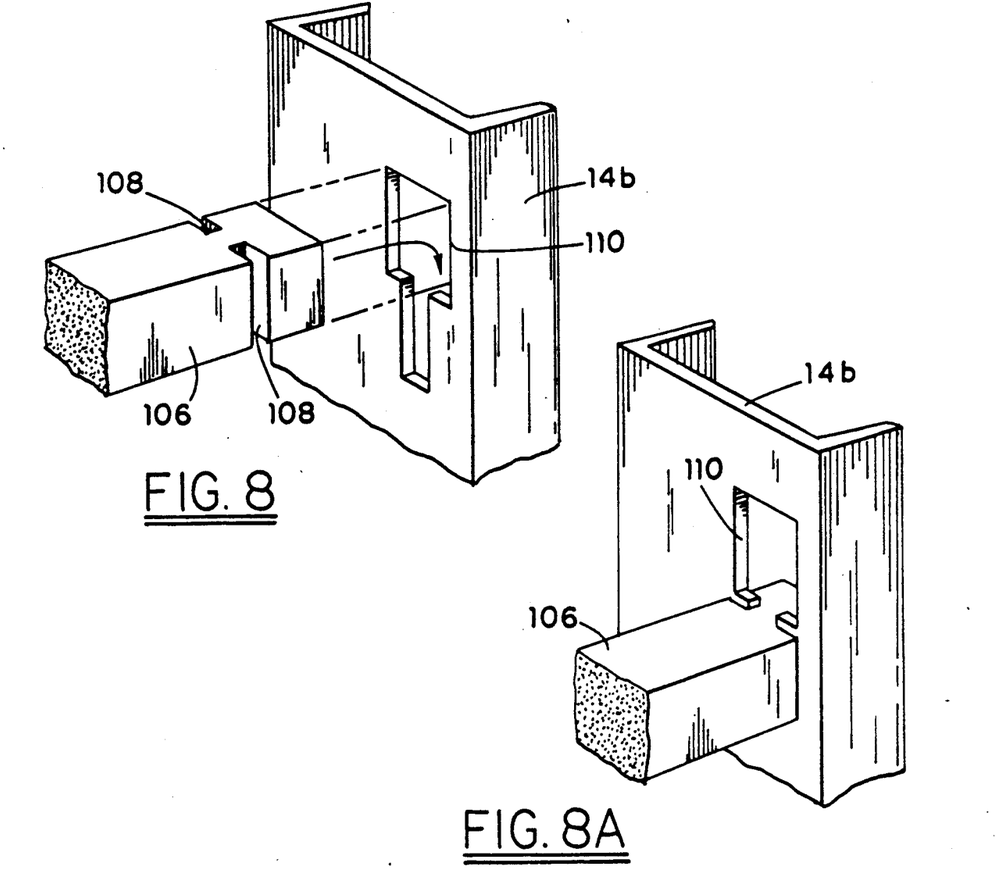
FIGS. 8 and 8A are perspective views of the portion of the monitor indicated by the dash line 8—8 in FIG. 3 in positions where the brackets supporting the shelf for the signal analyzer is being installed and is installed in the left side column of the frame of the monitor.

The support 18 for the analyzer consists of a table 104 disposed on a bracket bar 106. As shown in FIGS. 8 and 8A, the bracket bar 106 has slots 108 which fit into a hole 110 having larger and smaller interconnected openings so as to provide a releasable dovetail connection for the support 18. The analyzer 20 and its mount 18 are readily set up when the monitor is erected and disassembled by unplugging the analyzer 20 and removing the mount 18 from the column 14. The hole 110 is shown closer to the hinge 28 than to the post 90 which projects from the base plate 10. The table 104 is therefore disposed at a convenient height, say 3 feet, from the floor so that it can be operated and the radiation counts viewed on an indicator of the analyzer 20.

Figure 6:
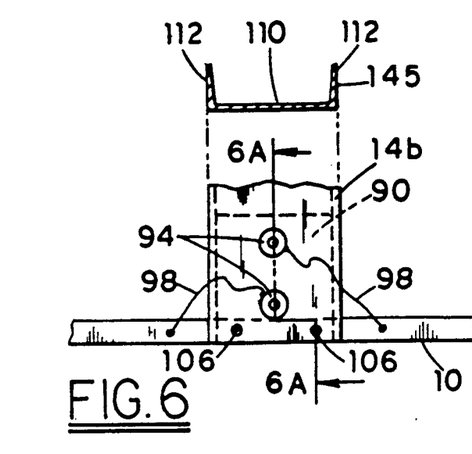
FIG. 6 is a fragmentary enlarged view of the region of the column indicated by the line 6—6 in FIG. 2.
Figure 6A:
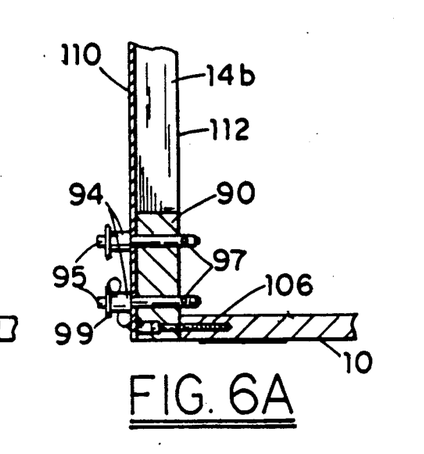
FIG. 6A is a sectional view taken along the lines 6A—6A in FIG. 6.

Referring to FIGS. 6 and 6A, the post 90 is a rectangular block which is disposed centered along the edge of the base plate 10. The post 90 is attached to the base plate 10 by screws 106 which may extend beyond the columns into the counter sunk holes in the post 90. The post 92 is assembled in the same way as the post 90 and is disposed along the opposite edge of the base plate opposed to and in alignment with the other post 90.

Figure 12:
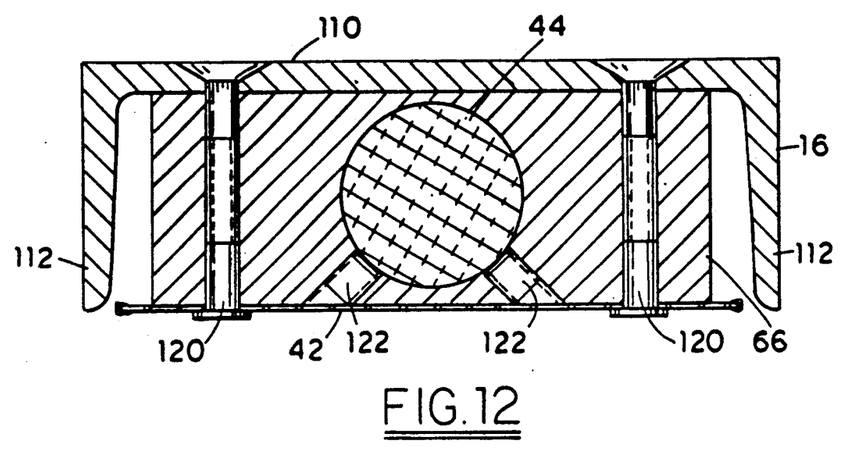
FIG. 12 and FIG. 13 are, respectively, sectional views taken along the lines 12—12 and 13—13 in FIG. 11.
Figure 13:
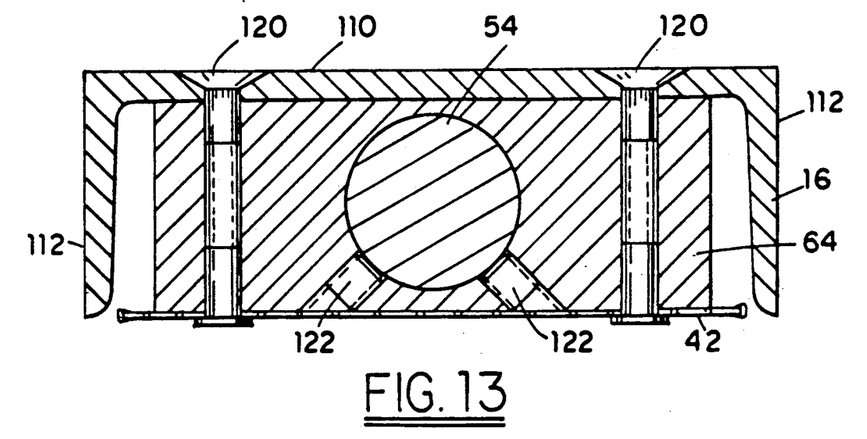
Figure 14:
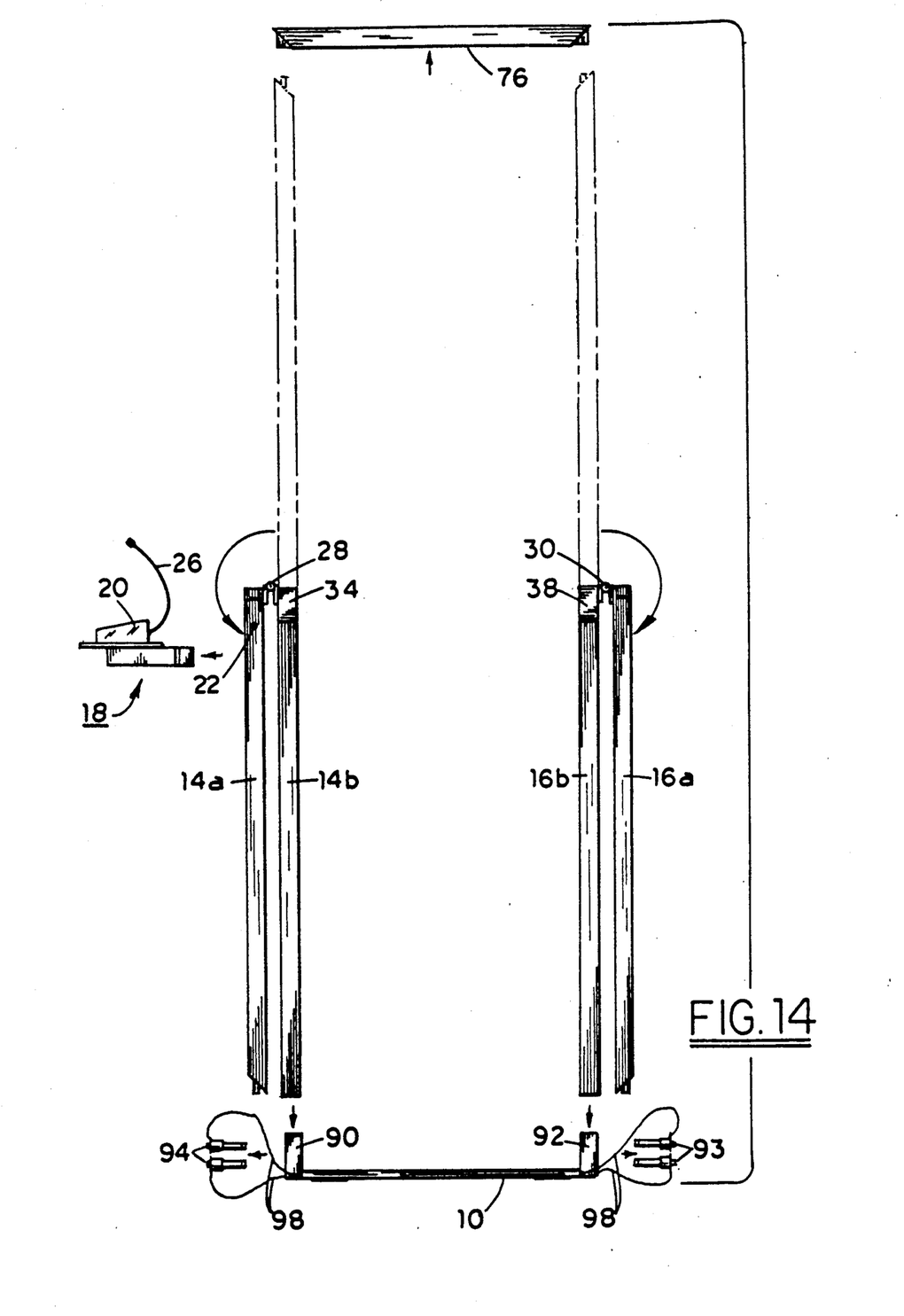
FIG. 14 is a diagramatic view indicating the method of disassembling the monitor shown in the preceding figures.

Both the columns 14 and 16 and the beam 76 are preferably channels having webs 110 with inwardly extending flanges 112 (see particularly, FIG. 6, 12 & 13). The hinges 28 and 30 are attached to the web on the outside of the channels and enable the columns to be collapsed with their web portions folded over each other as is shown in FIG. 14. The guards 40 and 42 on the parts 16b and 16b of the column 16 and similar guards on the parts 14a and 14b of the column 14 extend between the flanges 112. They are supported on the mounting blocks 60 to 74 which support the scintillator tubes 44, 46, 48 and 50 and the photomultipliers 52, 54, 56 and 58 as shown in FIG. 10 and also in FIGS. 11, 12 and 13. The mounting blocks are assembled to the web of the channels by rivets 120. These rivets may also be screws which extend in opposite directions into opposite sides of the blocks. The assembly is shown in FIGS. 12 and 13. It will be noted that inside rivets assemble the screens (e.g., the screen 42) to the blocks 64 and 66 and hold the screens between the flanges 112. Set screws 122 may be used to provide a rigid support in the blocks 64 and 66 for the scintillator tube 44 and multiplier 54 assembly. Further information as to the design and operation of photomultiplier-scintillator tube radiation detectors will be found in the above-referenced U.S. Pat. No. 4,509,042.

Figure 7:
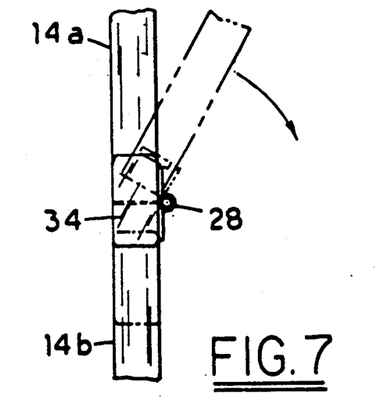
FIG. 7 is an enlarged view taken along the line 7—7 in FIG. 3.
Figure 7A:
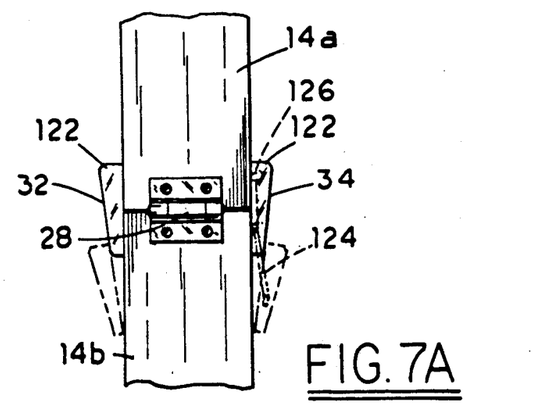
FIG. 7A is a right side view of the portion of the monitor shown in FIG. 7.

Referring to FIGS. 7 and 7A, the latches 32 and 34 are illustrated as being draw latches having covers 122 which are attached on one side to the lower column part 14 by toggle links 124. Catch bars 126 are connected to the upper column parts 14a. Thus, when the cover is pivoted and pulled down, a tight toggle connection is made which assembles and holds the column parts 14a and 14b erect and rigid. To disassemble and fold the column parts no additional tools or removable hardware is required. Rather the latch covers 122 are removed and one of the parts, for example, 14a is folded over the other part 14b as shown in FIG. 7.

Figures 9, 9A, 9B:
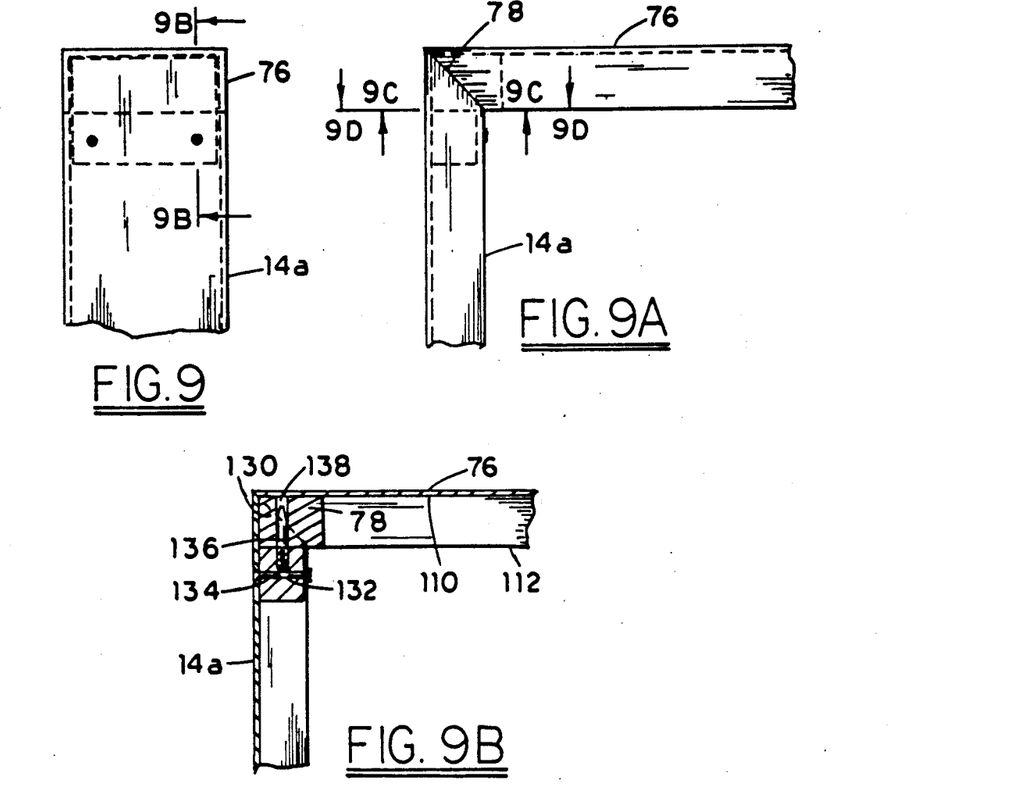
FIG. 9 is an enlarged view of the left corner of the frame indicated by the line 9—9 in FIG. 2.
FIG. 9A is a front view of the portion of the monitor shown in FIG. 9.
FIGS. 9B, C and D are fragmentary sectional views taken along the line 9B—9B in FIG. 9, 9C—9C in FIG. 9A and 9D—9D in FIG. 9A.
Figure 9C:
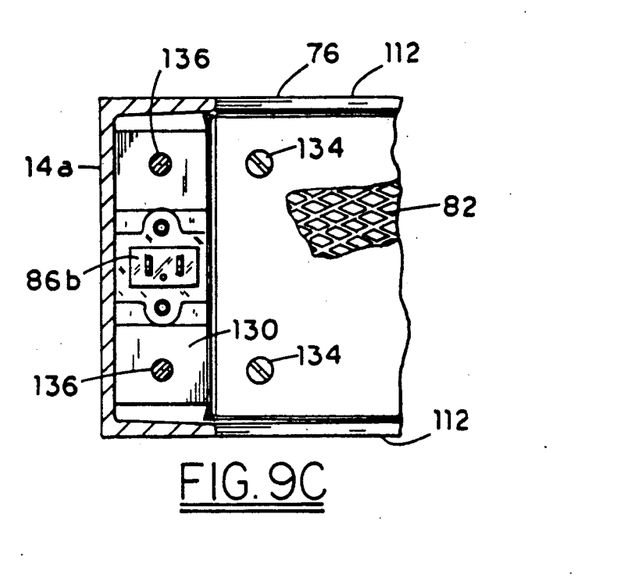
Figure 9D:
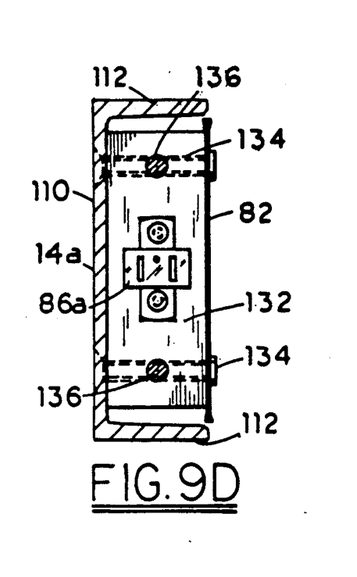

Referring to FIG. 9, the mechanical and electrical assembly which enables the beam 76 to be snapped into and out of the columns so as to make a mechanical as well as an electrical connection is shown. At each corner, where the columns meet the beam 76 to form the mitered junction 78, there is a mounting block 130 attached to the beam 76 which extends across the junction 78 when the beam and columns are assembled. Another mounting block 132 is mounted in the upper column part; the column part 14a being illustrated in FIGS. 9 through 9D. Rivets 134 or screws are used as was described in connection with FIGS. 12 and 13. The mounting block 78 with its screws 134 enables the attachment of the screen 82 between the flanges 112 of the web 110 of the channel which provides the beam 76.

The plug (male portion) 86b is connected to the mounting block 130 while the receptacle (female part) 86a is connected to the mounting block 132 in the upper column part 14a. Mechanical alignment and connection is provided by guide pins 136 which extend into holes 138 in the mounting block 130 of the beam 76. These pins also relieve stresses on the electrical connectors 86a and 86b. It will be apparent that the beam 76 may be removed by merely pushing it upwardly to release the pins 136 and the prongs of the connectors 86a and 86b.

Figure 15:
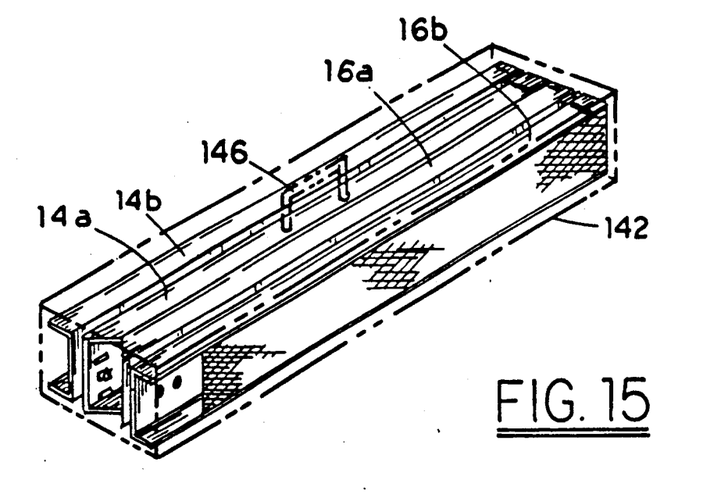
FIGS. 15 and 16 are perspective views showing how the parts of the monitor are stored in cases for transportation and storage.
Figure 16:
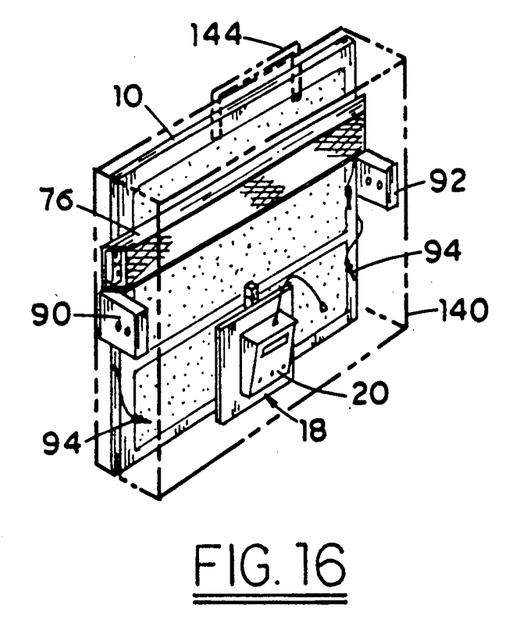

The disassembly of the monitor to collapsed position and the stowage thereof in cases 140 and 142 having handles 144 and 146 is shown in FIGS. 14, 15 and 16. As noted above, the beam 76 is first removed. Then the analyzer 20 is taken off the table of the mounting assembly 18 by releasing the dovetail connection. Next the columns 14 and 16 are released from the base plate 10 by pushing in the injector slides 95 (see FIG. 6A) of the pull pins 94. This releases the cross pins 97 in the pull pins. Note that the pull pins 94 extend through a hole in the post 90 which is aligned with a hole in the web 110 of the lower column part 14b. The pull pins may then be removed while the user's thumb depresses the slide 95 and pulls outwardly on the flange 99 of the pull pin. The pull pins are not lost because they are attached to the base plate by means of the cables 98.

After the columns are detached they are folded over by first releasing the latches 32 to 38 and then the parts 14a, 14b and 16a, 16b folding about the hinges 28 and 30. All of the disassembled parts may readily be stowed in the cases 140 and 142 in the manner illustrated in FIGS. 15 and 16.

From the foregoing description it will be apparent that there has been provided an improved radiation monitor, especially suitable for use as a portable personnel monitor. While a presently preferred embodiment of the invention has been described, variations and modifications therein, within the scope of the invention, will undoubtedly suggest themselves skilled in the arts. Accordingly, the foregoing description should be taken as illustrative and not a limiting sense.

We claim:

1. A nuclear radiation monitor which defines a passageway of sufficient size for an adult human subject and is convertible between erect and collapsed condition respectively, for use and for portability or storage, said monitor comprising a base, a pair of columns connected in hinged relationship and having two parts foldable over each other, latch means bridging said parts for releasable securing said parts in erect position, said base having means for receiving one of said parts of each of said columns on each side of said base and holding said columns in erect position, means attached to one of said one parts and said base for securing said columns to said base in erect position, radiation detector means disposed in at least one of said columns for providing a zone of sensitivity for nuclear radiation along substantially the entire length of said column and extending inwardly therefrom in a direction across said base, and a beam member releasable connecting said columns when in their erect condition and extending over said base, said columns, beam and base defining a frame having said passageway of sufficient length and width for passage of an adult human subject.

2. The monitor according to claim 1 wherein said radiation detection means is disposed in each of said columns, wiring means connecting said radiation detecting means extending along said columns and across said beam.

3. The monitor according to claim 2 wherein said columns and beam meet at joints, electrical connections having each a plug and a receptacle for interconnecting said wiring across said joints, one of said plug and receptacle of each said connections being disposed in said columns and the other in said beam.

4. The monitor according to claim 3 further comprising pairs of bodies to which said plugs and receptacles are mounted disposed in said columns and beam adjacent said joints, one of said each said pair of bodies being disposed in one of said column and beam and extending across said joint, the other of each said pair of bodies being disposed in the other of said column and beam, at least one pin and at least one hole which are aligned with each other being disposed, one in said one body and the other in said other body, said pin being received in said hole for aligning said beam and column and relieving stress on said plugs and receptacles.

5. The monitor according to claim 1 wherein said parts are channels having a web and flanges extending from the inside of said web, a hinge connected to the webs of each of said parts on the outside of said web for connecting the parts in hinged foldable relationship to bring the outside of said webs together when said parts are folded about said hinge, said latch means being disposed on the outside of each of said flanges, said latch means each including a cover member disposed on one of said parts and latchable upon the other of said parts for providing a rigid connection therebetween.

6. The monitor according to claim 5 wherein said means for receiving one of said parts comprises a post connected to said base and having a cross section approximately the same as defined by said web and flanges, aligned holes in said web and post, and a plurality of pull pins disposed in said aligned holes for assembling said columns in erect position on said base.

7. The monitor according to claim 6 wherein the web of one of said parts of said column which is disposed on said post has an opening in the web thereof, a plate for supporting nuclear radiation analyzing or alarm means, said opening being closer to said hinge than to said post, a bracket connected to said plate and having means removably attaching said bracket to said web in said hole, a connection in said channel for removably connecting said nuclear radiation analyzing or alarm means to said detector means.

8. The monitor according to claim 5 wherein said detector means comprises scintillator tubes having photodetectors connected to one end thereof, means mounting said tubes and photodetectors each in a different part of said column between said flanges, and wiring interconnecting said photo detectors having a sufficient length bridging said hinge to enable said parts to be folding about said hinge.

9. The monitor according to claim 8 further comprising screens for guarding said scintillator tubes, photo detectors and wiring disposed between said flanges of each of said parts of said column.

10. The monitor according to claim 9 wherein said mounting means comprises pairs of blocks disposed on said web between said flanges, said blocks being spaced apart, said blocks each having an opening in which said photo detectors and tubes are supported in assembled relationship, said screens being attached to said blocks.

11. The monitor according to claim 1 wherein each of said pair of columns is substantially identical and has the structure wherein said parts are channels having a web and flanges extending from the inside of said web, a hinge connected to the webs of each of said parts on the outside of said web for connecting the parts in hinged foldable relationship to bring the outside of said webs together when said parts are folded about said hinge, said latch means being disposed on the outside of each of said flanges, said latch means each including a cover member disposed on one of said parts and latchable upon the other of said parts for providing a rigid connection therebetween, and said beam member also being a column having a web and flanges.

12. The monitor according to claim 11 wherein said base has a pair of said posts along opposite edges thereof each of said posts and each of said columns having the structure wherein said means for receiving one of said parts comprises a post connected to said base and having a cross section approximately the same as defined by said web and flanges, aligned holes in said web and post, and a plurality of pull pins disposed in said aligned holes for assembling said columns in erect position on said base, and each of said posts being disposed centrally of said opposite edges so that said posts are opposed to each other.

13. The monitor according to claim 12 wherein the parts of each of said columns each has a scintillator tube and a photodetector mounted therein with the structure wherein said detector means comprises scintillator tubes having photodetectors connected to one end thereof, means mounting said tubes and photodetector each in a different part of said column between said flanges, and wiring interconnecting said photodetectors having a sufficient length bridging said hinge to enable said parts to be folding about said hinge.

14. The monitor according to claim 13 wherein said parts of said columns and said beam each have a guarding screen disposed therein with the structure for the parts of said column and further comprising screens for guarding said scintillator tubes, photo detectors and wiring disposed between said flanges of each of said part of said column, and a screen mounted in said channel of said beam between the flanges thereof to protect wiring therein.

* * * * *